No. 730,394. PATENTED JUNE 9, 1903.
O. C. PENNINGTON.
WEED DESTROYING ATTACHMENT FOR CULTIVATORS.
APPLICATION FILED JAN. 9, 1903.
NO MODEL. 2 SHEETS—SHEET 1.
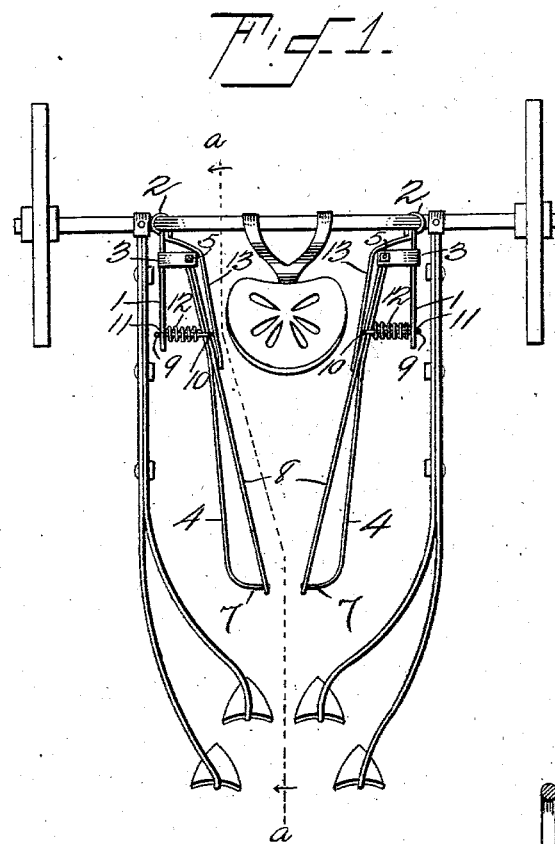
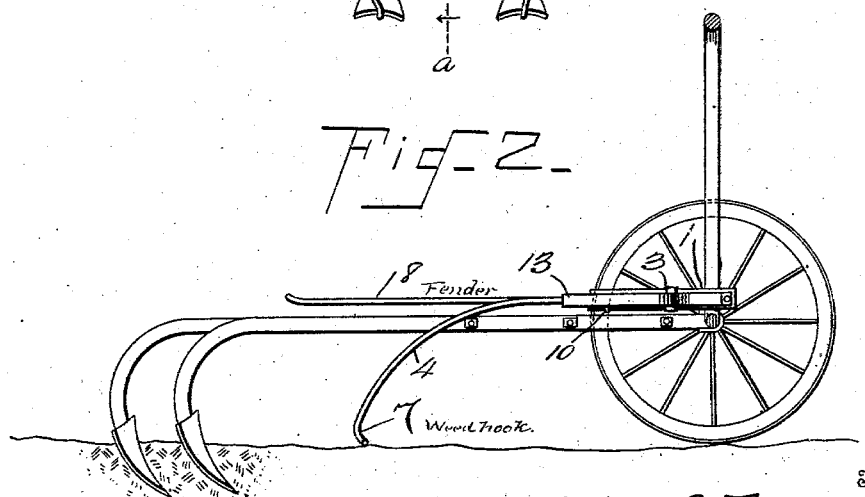
Witnesses
George Hilton
Inventor
Orbra C. Pennington,
By H. B. Willson & Co
Attorneys

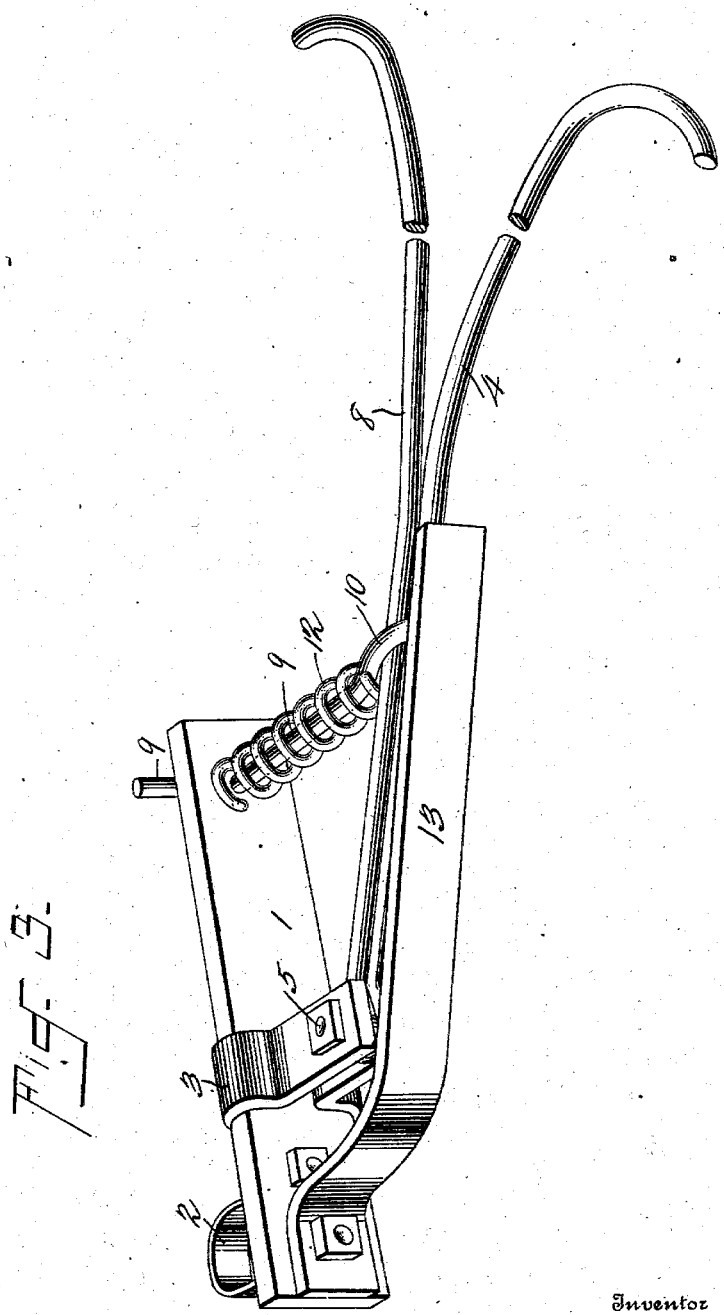

No. 730,394.

Patented June 9, 1903.

UNITED STATES PATENT OFFICE.

ORBRA CECIL PENNINGTON, OF SILVERCREEK, NEBRASKA.

WEED-DESTROYING ATTACHMENT FOR CULTIVATORS.

SPECIFICATION forming part of Letters Patent No. 730,394, dated June 9, 1903.

Application filed January 9, 1903. Serial No. 138,408. (No model.)

*To all whom it may concern:*

Be it known that I, ORBRA CECIL PENNINGTON, a citizen of the United States, residing at Silvercreek, in the county of Merrick and State of Nebraska, have invented certain new and useful Improvements in Weed-Destroying Attachments for Cultivators; and I do declare the following to be a full, clear, and exact description of the invention, such as will enable others skilled in the art to which it appertains to make and use the same.

My invention is an improved weed-destroying attachment for cultivators; and it consists in the peculiar construction and combination and arrangement of devices hereinafter described and claimed.

The object of my invention is to provide a novel and efficient apparatus which is adapted to be attached to and removed from a cultivator and which when in operation serves to drag down weeds which are too large to be otherwise covered by the cultivating-shovels, so as to cause the same to be buried under the soil, and thereby destroyed.

In the accompanying drawings, Figure 1 is a top plan view of a sulky-cultivator provided with a pair of my improved weed-destroying devices. Fig. 2 is a partial vertical longitudinal sectional view of the same, taken on the plane indicated by the line $aa$ of Fig. 1; and Fig. 3 is a detail perspective view, on a larger scale, of a portion of one of my improved weed-destroying devices.

In the embodiment of my invention here shown I provide a supporting-arm 1, the front end of which may be secured, as by a clip 2, to one side of the arched axle of a cultivator of the usual form.

Where used in connection with a sulky-cultivator having an arched axle, two of my improved weed-destroying devices will be employed, one to operate on each side of the row of corn straddled by a cultivator. I will now describe one of my said weed-destroying devices.

From one side of the arm 1, which in the form of my invention here shown is the inner side thereof, projects a bracket 3, which may be either of the form here shown or of any other suitable construction. The front end of a weed-dragging hook 4 is pivotally connected, as by a bolt 5, to the said bracket, the said weed-dragging hook comprising a bar or rod of suitable length having its rear portion bent downwardly and provided on one side with a laterally-projecting bill 7. A fender 8 is disposed above and substantially in the same vertical plane with the outer end of the bill of the hook. This fender in the form of my invention here shown is formed integral with the weed-dragging hook 4, the fender and the weed-dragging hook being both bent from a single bar or rod of iron or steel to form an eye at the front end for the engagement of the pivotal bolt and rearwardly-extending parallel arms from which the fender and the weed-dragging hook diverge upwardly and downwardly, respectively. A guide-link 9 is here shown as provided at one end with an eye 10 for the reception of the parallel arms of the drag-hook and fender. The opposite portion of said guide-link operates in an opening 11 at the rear end of the arm 1, and on the said guide-link is a coiled extensile spring 12, the function of which is to normally press the weed-dragging hook and fender laterally in one direction from the arm 1 toward the row of corn and to permit the weed-dragging hook and fender to move laterally from the corn to avoid injury to the corn. The weed-dragging hook operates at or near the ground immediately in proximity to the corn-row and as the cultivator advances serves to drag down such weeds as are too large to be otherwise covered by the cultivator-shovels, thereby insuring the destruction of the larger weeds also. The fender by bearing against one side of the cornstalks prevents the weed-dragging hook from engaging the corn and destroying the same, as will be understood. The pivotal front portions of the weed-dragging hook and fender, as well as the guide-link and the spring, are preferably provided with a shield 13. (Shown in Fig. 3.) Any suitable form of spring may be employed in lieu of the coil-spring here shown.

It will be understood that my improved weed-destroying device may be used in connection with any ordinary form of cultivator, and I do not desire to limit myself to its use in connection with a sulky-cultivator. Neither do I desire to limit myself to the precise construction and combination of devices here shown and described, as it is evident that modifications may be made therein without departing from the spirit of my invention and within the scope of the appended claims.

From the foregoing description, taken in connection with the accompanying drawings, the construction, operation, and advantages of my invention will be readily apparent, it is thought, without requiring a more extended explanation.

Having thus fully described my invention, what I claim as new, and desire to protect by Letters Patent, is—

1. The combination with a supporting element, of a weed-dragging hook pivotally connected thereto and movable laterally toward and from the same, a spring to normally press the weed-dragging hook from the support, and a fender movable with the weed-dragging hook to prevent the latter from engaging the corn, substantially as described.

2. In combination with a support, a weed-dragging hook having an elevated fender above the bill thereof and having its front end pivoted to the support, and a spring to normally press the weed-dragging hook and fender laterally in one direction from the support, substantially as described.

3. The combination of a supporting-arm, means to secure the same to the cultivator, a weed-dragging hook pivotally connected to the said arm and having a fender for the purpose set forth, and a spring to normally press the said weed-dragging hook laterally in one direction from the said supporting-arm, substantially as described.

In testimony whereof I have hereunto set my hand in presence of two subscribing witnesses.

ORBRA CECIL PENNINGTON.

Witnesses:
W. A. WAY,
W. N. HENSLEY.